(12) United States Patent
Cernoch et al.

(10) Patent No.: US 8,147,990 B2
(45) Date of Patent: Apr. 3, 2012

(54) CERAMIC MATERIAL AND ELECTROCERAMIC COMPONENT COMPRISING THE CERAMIC MATERIAL

(75) Inventors: Claus Cernoch, Klagenfort (AT); Adalbert Feltz, Deutschlandsberg (AT)

(73) Assignee: EPCOS AG, Munich (DE)

( * ) Notice: Subject to any disclaimer, the term of this patent is extended or adjusted under 35 U.S.C. 154(b) by 123 days.

(21) Appl. No.: 12/556,297

(22) Filed: Sep. 9, 2009

(65) Prior Publication Data

US 2010/0055497 A1    Mar. 4, 2010

Related U.S. Application Data

(63) Continuation of application No. PCT/EP2008/052628, filed on Mar. 4, 2008.

(30) Foreign Application Priority Data

Mar. 15, 2007  (DE) .................. 10 2007 012 468

(51) Int. Cl.
 *B32B 18/00* (2006.01)
 *C04B 35/50* (2006.01)
 *H01B 1/08* (2006.01)
(52) U.S. Cl. .................. 428/697; 428/419; 252/519.15; 501/152; 502/525
(58) Field of Classification Search .................. None
 See application file for complete search history.

(56) References Cited

U.S. PATENT DOCUMENTS

| | | | |
|---|---|---|---|
| 4,045,375 A | 8/1977 | Komatu | |
| 4,049,583 A * | 9/1977 | Lauder | 502/303 |
| 5,637,543 A * | 6/1997 | Iwaya et al. | 501/152 |
| 5,661,094 A | 8/1997 | Feltz et al. | |
| 6,306,315 B1 | 10/2001 | Ogata et al. | |
| 6,663,794 B2 | 12/2003 | Ogata et al. | |
| 6,835,684 B2 * | 12/2004 | Tietz et al. | 501/134 |
| 2002/0013214 A1 * | 1/2002 | Kuroda et al. | 501/152 |
| 2009/0016409 A1 | 1/2009 | Mizoguchi et al. | |

FOREIGN PATENT DOCUMENTS

| | | |
|---|---|---|
| DE | 197 40 262 C1 | 4/1999 |
| DE | 198 32 843 A1 | 2/2000 |
| DE | 198 34 423 B4 | 2/2000 |
| EP | 0 687 656 A1 | 12/1995 |
| EP | 0 626 356 B1 | 9/1999 |
| EP | 0 687 656 B1 | 3/2000 |
| EP | 1 775 274 A1 | 4/2007 |
| JP | 11-251109 A | 9/1999 |

(Continued)

OTHER PUBLICATIONS

Katsuki. N., et al., "Exhaust Gas High Temperature Sensor for LEV/ULEV and OBD Systems," Society of Automotive Engineers, Inc., 1996, pp. 149-155.

(Continued)

*Primary Examiner* — Jennifer McNeil
*Assistant Examiner* — Vera Katz
(74) *Attorney, Agent, or Firm* — Slater & Matsil, L.L.P.

(57) ABSTRACT

A ceramic material with a negative temperature coefficient of specific resistance has the general formula $[\{(SE_1^{III}, SE_2^{III})_{1-x}(M_1^{II}, M_2^{II})_x\}(Cr_{1-y-z}Mn_y(Me_1^{III}, Me_2^{III})_z)O_3]$. In this formula, $SE_1^{III}$ and $SE_2^{III}$ are different rare-earth metal cations, $M_1^{II}$ and $M_2^{II}$ are selected from $Ca^{II}$, $Sr^{II}$, and $Me_1^{III}$ and $Me_2^{III}$ are redox-stable, trivalent metal cations, wherein the following applies with respect to the parameters: $0<x<1$; $0<z<1$; $0<y<1-z$.

20 Claims, 1 Drawing Sheet

FOREIGN PATENT DOCUMENTS

| | | |
|---|---|---|
| JP | 2003-183075 A | 7/2003 |
| JP | 2006-054258 A | 2/2006 |
| WO | WO 2006/109792 A1 | 10/2006 |

OTHER PUBLICATIONS

Ishikawa, K., et al., "Thermistor Sensor for Automotive Uses," National Technical Report, vol. 34, No. 4, Aug. 4, 1998, pp. 24-34.

"High Temperature NTC Glass Encapsulated Thermistors," Keystone Carbon Company, Bulletin HT 489, 1989, 3 pages.

Feltz, A., et al., "$Sr_7MN_4O_{15}$ high temperature NTC thermistors," Journal of Material Science Letters 18, 1999, pp. 1693-1695.

Houviet, D., "High Temperature NTC ceramic resistors (ambient-1000 °C)," Journal of the European Ceramic Society 24, 2004, pp. 1237-1241.

\* cited by examiner

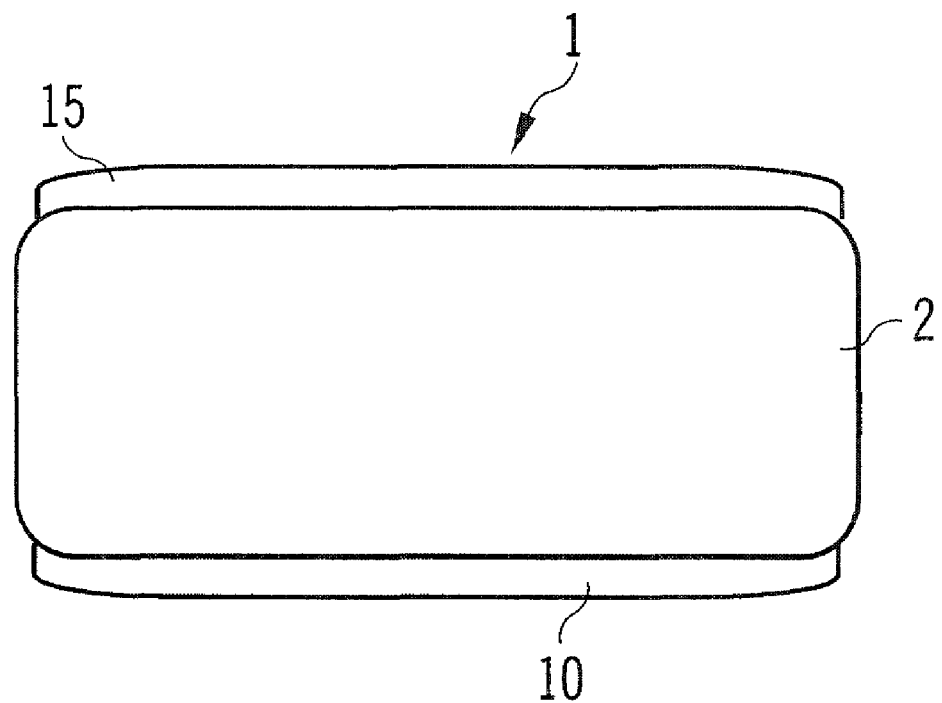

CERAMIC MATERIAL AND ELECTROCERAMIC COMPONENT COMPRISING THE CERAMIC MATERIAL

This application is a continuation of co-pending International Application No. PCT/EP2008/052628, filed Mar. 4, 2008, which designated the United States and was not published in English, and which claims priority to German Application No. 10 2007 012 468.8 filed Mar. 15, 2007, both of which applications are incorporated herein by reference.

TECHNICAL FIELD

The patent application relates to a ceramic material and also to a component comprising the ceramic material.

BACKGROUND

Ceramics with a negative temperature coefficient are used, for example, in thermistors for temperature measurements. A high-temperature-stable thermistor known from the publication JP 2006054258 A has a sintered body of metal oxide with a molar ratio of Y, Cr, Mn, and Ca of 79.5:8.5:8.5:3.5.

SUMMARY

At least some embodiments of the present invention disclose another ceramic material with a negative temperature coefficient.

One embodiment of the invention discloses a ceramic material with a negative temperature coefficient of specific resistance with the following general formula:

$$[\{(SE_1^{III},SE_2^{III})_{1-x}(M_1^{II},M_2^{II})_x\}(Cr_{1-y-z}Mn_y(Me_1^{III},Me_2^{III})_z)O_3]$$

wherein $SE_1^{III}$ or $SE_2^{III}$ are rare-earth metal cations, $M_1^{II}$ and $M_2^{II}$ are selected from $Ca^{II}$, $Sr^{II}$, and $Me_1^{III}$ and $Me_2^{III}$ are redox-stable, trivalent metal cations.

Through the at least partial replacement of Cr by the trivalent metals $Me_1^{III}$, $Me_2^{III}$ through appropriate variation of the parameter z, the resistance of the ceramic material can be set to desired values. Furthermore, the ceramic material can have a Perovskite crystal structure of the general formula $ABX_3$, wherein the rare-earth metal cations $SE_1^{III}$, $SE_2^{III}$ and the bivalent metal cations $M_1^{II}$ and $M_2^{II}$ occupy the A sites in the crystal lattice. The B sites are assumed by the metal cations Cr, Mn, $Me_1^{III}$ and $Me_2^{III}$ and the X sites are assumed by oxygen. The following applies with respect to the parameters x, z, and y:

$x<1; y+z<1; 0<x<1; 0<z<1; 0<y<1-z.$

In another embodiment of the ceramic material according to the invention, both Cr and also Mn are present in the form of trivalent and tetravalent metal cations, so that the following general formula applies for the ceramic material:

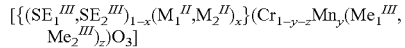

wherein $SE_1^{III}$ or $SE_2^{III}$ are rare-earth metal cations, $M_1^{II}$ and $M_2^{II}$ are selected from $Ca^{II}$, $Sr^{II}$ and $Me_1^{III}$ and $Me_2^{III}$ are redox-stable, trivalent metal cations, wherein the following applies with respect to the parameters:

$x+y+z<1; 0<x<1; 0<z<1; 0\leq t\leq x$ where, for $0<t<x$, the following applies: $t\leq y\leq 1+t-x-z$, for $t=0$ the following applies: $0<y\leq 1-x-z$, and for $t=x$, the following applies: $x<y<1-z$.

The formulation $(SE_1^{III},SE_2^{III})$ in the above general formulas means that at equivalent lattice sites within the crystal lattice of the ceramic material, either only the rare-earth metal $SE_1^{III}$ or only the rare-earth metal $SE_2^{III}$ can be present, or also that at equivalent lattice sites at different positions within a ceramic material both $SE_1^{III}$ and also $SE_2^{III}$ can be present one next to the other. The corresponding significance is also given to the formulations $(M_1^{II},M_2^{II})$ for the bivalent metal cations and $(Me_1^{III},Me_2^{III})$ for the trivalent, redox-stable metal cations.

The inventors recognized that for the ceramic materials of the general formulas mentioned above, current transport can take place by means of position-switching processes between metal cations, primarily transition metal cations of different oxidation states. This can also be called polaron conduction ("hopping conduction"). This can lead, e.g., to charge transport between non-redox-stable transition metal cations, e.g., from $Cr^{III}$ to $Cr^{IV}$ or from $Mn^{III}$ to $Mn^{IV}$ or to two-way transitions between $Cr^{III}/Mn^{IV}$ or $Mn^{III}/Cr^{IV}$ within the ceramic material. By exchanging these non-redox-stable transition metal cations for the redox-stable, trivalent metals $Me^{III}$, the charge transport can be reduced due to an increase in the average hopping distance and a resulting decrease in current paths. By adjusting the parameter z for the trivalent metal $Me^{III}$, ceramic materials can be consequently produced with increased resistance and increased B constant in comparison to ceramic materials in which the non-redox-stable transition metal cations are not partially replaced by redox-stable trivalent metal cations $Me^{III}$. Through variation of the parameter z and also additional variation of the parameters x and y, the electrical properties of the ceramic material could be set to a desired value within wide limits. Polarons are understood to be quasiparticles appearing in the ceramic material, wherein a charge carrier appearing during charge transport creates lattice deformations in its surroundings in the at least partially ionically bound solid body of the ceramic material. The totality of the charge carrier and the lattice deformation is here called a polaron.

Due to a charge transfer between $Cr^{IV}$ and $Mn^{III}$ in the ceramic material of the general formula mentioned above, this ceramic material could also be represented by two general limit formulas. For a complete charge transfer between $Cr^{IV}$ and $Mn^{III}$, that is, for $t=x$, the ceramic material could be described by the following general formula:

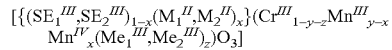

If there is no charge transfer between $Cr^{IV}$ and $Mn^{III}$, that is, for $t=0$, the ceramic material could be described by the following general formula:

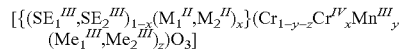

The two formulas represent "limit formulas." However, distributions of oxidation states of the non-redox-stable transition metal cations could also be present in the ceramic material, in which distribution of this charge transfer has taken place only partially, that is, the case $0<t<x$.

In another embodiment, the ceramic material could form a single homogeneous phase. In the boundary with phase-heterogeneous systems, a disadvantageous drift of the electrical properties caused by time-dependent material transports at the contact zones of different phases can be avoided or at least reduced.

In another embodiment, the ceramic material could be understood as a phase-homogeneous Perovskite mixed-crystal system of an electrically semiconductive first Perovskite system and an electrically non-conductive second Perovskite system. Therefore, it can be possible to provide a thermodynamically stable ceramic material even at a high temperature. Therefore, the disadvantages of a time drift of the electrical parameters associated with non-phase-homogeneous ceramic systems in the temperature range used for the temperature measurements can be reduced or prevented within the scope of set limits. Thus, resistors can be produced from the ceramic material, wherein these resistors satisfy the resistance values and temperature dependency required by a high-temperature negative temperature coefficient thermistor.

For such a phase-homogeneous Perovskite mixed-crystal system, for example, the charge transport can take place by the position switching mentioned above of charge carriers between transition metal cations of different oxidation states, wherein these transition metal cations are arranged in the network of corner-sharing oxygen octahedrons of the Perovskite structure.

In another embodiment of the invention, the first electrically semiconductive Perovskite system could have the general structural formula $\{(SE_1^{III}, SE_2^{III})_{1-x}(M_1^{II}, M_2^{II})_x\}$ $(Cr^{III}_{1-x-y+t}Cr^{V}_{x-t}Mn^{III}_{y-t}Mn^{IV}_t)O_3$, wherein, the percentage of $Cr^{IV}$ or $Mn^{IV}$ can be variable corresponding to $0 \leq t \leq x$, and the second electrically non-conductive Perovskite system has the general structural formula $(SE_1^{III}, SE_2^{III})(Me_1^{III}, Me_2^{III})O_3$. Through the combination of the first electrically semiconductive Perovskite system with the second electrically non-conductive Perovskite system, the electrical properties can be similarly easily adjusted by different mixture ratios of the two Perovskite systems.

Furthermore, it is possible to adjust the electrical properties of the ceramic material within a wide range of parameters for the parameters x, y, and z. This is easily possible for parameter ranges of x between 0.01 and 0.5, preferably 0.01-0.3, for the parameter y between 0.01 and 0.7, preferably, 0.1-0.3, and for the parameter z between 0.05 and 0.9, preferably between 0.1 and 0.5, wherein each mentioned value is also included within the ranges.

The rare-earth metals $SE^{III}$ can be present here individually or in mixtures with variable concentrations at the same positions of the crystal structure of the phase-homogeneous Perovskite mixed-crystal system, wherein Y, La, Ce, and Sm are preferred.

The trivalent redox-stable metal $Me^{III}$ can be, primarily, $Al^{III}$, $Ga^{III}$, or mixtures thereof.

The phase-homogeneous Perovskite mixed-crystal system can be described by the mixed-crystal formation between the electrically semiconductive Perovskite system and $SE^{III}AlO_3$ or $SE^{III}GaO_3$. In this way, fluctuations of the contacts between various adjacent grains in the micrometer range of the ceramic material of the conductive components, like those normally occurring for heterogeneous, non-single-phase mixtures of two powder components, can be reduced to fractions of nanometers on the atomic scale of the Perovskite structure.

The subject matter of another embodiment of the invention is also an electroceramic component that comprises one of the ceramic materials mentioned above. Here, it is possible that the electroceramic component has a ceramic base body that contains the ceramic material mentioned above and also contains electrically conductive contacts on the surface, for example, based on platinum.

Such electroceramic components could be, for example, negative temperature coefficient thermistors and could be used for temperature measurements in thermistors up to the range of higher temperatures of approximately 1000° C. Such negative temperature coefficient thermistors could be used, for example, in technical devices of exhaust-gas sensors in combustion engines for particulate filters and catalytic converters.

By means of the various embodiments of the ceramic materials mentioned above, NTC thermistors can be produced that have no or only a reduced time drift of the characteristics, and thus are sufficiently stable in terms of aging even at higher temperatures. With the resistance $R_T$ or the specific resistance PT with respect to a nominal temperature designated by the index N, for example, 25° C., the characteristic curve can be described approximately by the Arrhenius relationship:

$$R_T = R_N \exp[B/T] \text{ or } \rho_T = \rho_N \exp[B/T]$$

where the B constant in degrees Kelvin is interrelated with the thermal activation energy $E_A$ via Bolzmann's constant k according to $B = E_A/k$. The thermal activation energy specifies the activation energy for polaron conduction and is related, in general, to a certain temperature interval, for example, according to $B_{25/100° C.}$, to 25-100° C. The B constant is also a measure for the temperature-dependent sensitivity a that specifies the change in resistance as a function of the temperature:

$$\alpha = 1/\rho_T(d\rho_T/dT) = -B/T^2$$

of a thermistor.

Furthermore, the subject matter of another embodiment of the invention is a method for producing a ceramic material wherein a mixture of the compounds $SE^{III}_2O_3$, $M^{II}CO_3$, $Cr_2O_3$, $Mn_2O_3$, $Mn_3O_4$, $MnCO_3$ and $Me^{III}_2O_3$ in the desired quantities is produced, and then a ceramic material is produced by means of sintering. By means of sintering and redox transitions taking place here among the various metal cations, the Perovskite systems mentioned above and also the ceramic materials of the general formulas mentioned above can be formed.

Here it is also possible to precipitate out the compounds mentioned above, for example, from the aqueous phase, and then to perform drying and sintering. Furthermore, the compounds mentioned above can be mixed and then calcined at temperatures from approximately 1000-1300° C., preferably 1050-1200° C. Then, by means of intermediate grinding, a grain size $d_{50}$ of approximately one micrometer can be achieved (approximately 50 percent of the grains then have a grain size of approximately one micrometer). The dispersity of the powder can also lie in grain size range $d_{50}$ of approximately 0.3-1 micrometer after the intermediate grinding and after subsequent fine grinding.

According to another embodiment of a method according to the invention, a phase-homogeneous Perovskite mixed-crystal system can then be formed that forms a uniform phase.

The sintering process can be performed, for example, at temperatures between 1400 and 1600° C., preferably between 1400 and 1500° C. Here it is also possible to add sintering aids, for example, $Li_2CO_3$, $Li_2SO_4$, or $Bi_2O_3$, in order to achieve sufficient sintering compaction.

BRIEF DESCRIPTION OF THE DRAWINGS

Below, various embodiments of the invention will be explained with reference to the examples and a drawing.

The lone FIGURE shows an electroceramic component in cross section.

DETAILED DESCRIPTION OF ILLUSTRATIVE EMBODIMENTS

The lone FIGURE shows an electroceramic component 1 in cross section. The ceramic base body 2 here contains at least one embodiment of the ceramic materials mentioned above and thus represents a negative temperature coefficient thermistor. The electrically conductive contact surfaces 10 and 15 are arranged on the two opposing primary faces.

One particular embodiment will now be described.

Production of the ceramic material $Y_{0.84}Ca_{0.16}Cr_{0.6}Mn_{0.2}Al_{0.2}O_3$ (x=0.16; y=0.2; z=0.2)

For the production of 250 g powder, 51.99 wt. % $Y_2O_3$, 8.04 wt. % $CaCO_3$, 22.95 wt. % $Cr_2O_3$, 7.73 wt. % $Mn_2O_3$, and 5.60 wt. % $Al_2O_3$ are weighed out and pre-ground together with 200-300 g deionized water. After the drying, the first calcination of the powder is carried out for 4 hours at 1050-1150° C. The subsequent main grinding of the aqueous suspension is carried out with yttrium-stabilized zirconium oxide pellets, wherein a target grain size $d_{50}$ less than 1.5 μm is the goal. After new drying and second calcination of the powder material at 1100-1200° C. for 4 hours, a fine grinding process is performed to a grain size $d_{50}$ less than 0.8 μm. To increase the sintering activity, 1-2 mol % $Bi_2O_3$, for example, is added to this powder and homogenized in an eccentric mill.

For the production of test bodies, the ceramic powder is worked into a pressed granulate in order to fabricate disk-shaped pressed parts from this granulate. The electrical connection to the NTC ceramic is effected by applying a Pt paste on the two primary faces of the test disks, to serve as electrical contact surfaces, with screen printing. Then both the electrical contact surfaces are baked into the ceramic base body, and the ceramic material is also sintered, by means of co-sintering. The sintering takes place after customary debinding at 1400-1500° C. for a dwell time of 1-3 hours.

The stability of the NTC components produced in this way is then evaluated by resistance measurements in stable temperature baths and the electrical drifts due to aging during corresponding high-temperature storage are characterized (see Tables 1 and 2 below).

In order to determine the electrical parameters of certain embodiments of ceramic materials, cylindrical ceramic samples with a diameter of 3 mm and a height of 1.5 mm with electrically conductive platinum contact surfaces, are produced according to the method described above, wherein different weights of the original materials are used according to the desired composition of the ceramic material. The general formula of the ceramic materials used here is:

$$Y^{III}_{1-x}Ca^{II}_x(Cr_{1-y-z}Mn_yAl_z)O_3.$$

Both Cr and also Mn can be present as trivalent and tetravalent metal cations, so that the following general limit formulas are produced:

$$Y^{III}_{1-x}Ca^{II}_x(Cr^{III}_{1-x-y-z}Cr^{IV}_xMn^{III}_yAl_z)O_3 \text{ or}$$

$$Y^{III}_{1-x}Ca^{II}_x(Cr^{III}_{1-y-z}Mn^{IV}_xMn^{III}_{y-x}Al_z)O_3$$

The electrical properties and the aging behavior of the cylindrical ceramic samples were then determined, wherein the aging behavior was determined in the period of a pre-aging stage from the percentage changes $\Delta\rho_{25}$ of the specific resistance or the change of the B value $\Delta B$ after storage times of 72 hours and an additional 72 hours, that is, 144 hours, at the specified temperatures up to 500° C. Here, the information specifies the change with respect to the storage stage. The values measured at 800 and at 1000° C. result from a continuation after the aging at 500° C.

TABLE 1

Aging behavior of the samples

| Composition | | | $\rho_{25°C}$/kΩcm | B/K | $\Delta\rho_{25°C}$/% (72 h, T in ° C.) | | | | | | $\Delta\rho_{25°C}$/% (144 h, T in ° C.) | | | | | |
|---|---|---|---|---|---|---|---|---|---|---|---|---|---|---|---|---|
| x | y | z | 20 parts | 20 parts | 80 | 150 | 300 | 500 | 800 | 1000 | 80 | 150 | 300 | 500 | 800 | 1000 |
| 0.20 | 0.20 | 0.2 | 3.83 ± 4% | 3270 ± 0.10% | +0.9 | +5.6 | +5.3 | −0.1 | +1.3 | — | +0.4 | +2.0 | −0.5 | −0.1 | +0.1 | — |
| 0.16 | 0.264 | 0.2 | 18.3 ± 4% | 3533 ± 0.10% | +0.7 | +1.0 | +0.4 | +0.1 | −6.9 | — | +0.2 | +0.3 | +0.1 | +0.2 | −0.9 | — |
| 0.18 | 0.225 | 0.1 | 28.1 ± 4% | 3680 ± 0.05% | +0.3 | +0.8 | ±0 | −0.2 | −1.9 | −0.6 | +0.2 | +0.4 | +0.1 | ±0 | ±0 | +0.4 |
| 0.16 | 0.20 | 0.2 | 114 ± 3% | 3927 ± 0.05% | +0.3 | +0.6 | ±0 | ±0 | −2.1 | −1.2 | +0.1 | +0.2 | ±0 | ±0 | ±0 | +0.1 |
| 0.12 | 0.24 | 0.2 | 124 ± 5% | 3755 ± 0.07% | +2.0 | +2.4 | +0.8 | +0.4 | −3.9 | — | +1.1 | +0.9 | +0.1 | −0.1 | −0.9 | — |
| 0.12 | 0.20 | 0.2 | 342 ± 5% | 3925 ± 0.05% | +1.5 | +1.9 | +0.8 | +0.3 | −2.5 | −1.5 | +1.1 | +1.0 | +0.2 | ±0 | −0.5 | −0.4 |
| 0.14 | 0.175 | 0.3 | 565 ± 5% | 4177 ± 0.06% | +0.2 | +0.3 | −0.1 | −0.5 | −3.2 | — | +0.4 | +0.3 | +0.2 | +0.2 | −0.9 | — |
| 0.12 | 0.16 | 0.2 | 657 ± 5% | 4216 ± 0.04% | +0.5 | +2.7 | +1.3 | +0.6 | −2.7 | — | +1.1 | +1.2 | +0.2 | +0.2 | −0.4 | — |

TABLE 2

Changes in the B-values of the samples

| Composition | | | $\rho_{25°C}$/kΩcm | B/K | $\Delta B/\%$ (72 h, T in ° C.) | | | | | | $\Delta B/\%$ (144 h, T in ° C.) | | | | | |
|---|---|---|---|---|---|---|---|---|---|---|---|---|---|---|---|---|
| x | y | z | 20 parts | 20 parts | 80 | 150 | 300 | 500 | 800 | 1000 | 80 | 100 | 300 | 500 | 800 | 1000 |
| 0.20 | 0.20 | 0.2 | 3.83 ± 4% | 3270 ± 0.10% | +0.05 | +0.46 | +0.68 | −0.07 | +0.48 | — | −0.02 | +0.15 | −0.15 | −0.10 | +0.08 | — |
| 0.16 | 0.264 | 0.2 | 18.25 ± 4% | 3533 ± 0.10% | +0.12 | +0.20 | +0.14 | +0.10 | −0.01 | — | −0.04 | −0.01 | −0.02 | −0.04 | −0.01 | — |
| 0.18 | 0.225 | 0.1 | 28.1 ± 4% | 3680 ± 0.05% | ±0 | +0.06 | −0.02 | −0.01 | +0.05 | −0.12 | −0.05 | ±0 | +0.01 | +0.01 | +0.08 | +0.06 |
| 0.16 | 0.20 | 0.2 | 114 ± 3% | 3927 ± 0.05% | +0.01 | +0.03 | ±0 | −0.01 | +0.01 | −0.15 | ±0 | ±0 | ±0 | ±0 | +0.07 | +0.02 |
| 0.12 | 0.24 | 0.2 | 124 ± 5% | 3755 ± 0.07% | −0.05 | +0.03 | +0.07 | +0.08 | 0.05 | — | +0.11 | +0.23 | −0.02 | −0.06 | −0.02 | — |
| 0.12 | 0.20 | 0.2 | 342 ± 5% | 3925 ± 0.05% | −0.07 | −0.03 | ±0 | +0.03 | +0.02 | −0.07 | +0.06 | +0.05 | −0.02 | ±0 | +0.01 | −0.06 |
| 0.14 | 0.175 | 0.3 | 565 ± 5% | 4177 ± 0.06% | −0.01 | −0.02 | −0.02 | −0.03 | +0.06 | — | −0.02 | ±0 | ±0 | −0.05 | −0.04 | — |
| 0.12 | 0.16 | 0.2 | 657 ± 5% | 4216 ± 0.04% | −0.06 | ±0 | +0.05 | +0.01 | −0.01 | — | +0.07 | +0.05 | −0.08 | −0.02 | ±0 | — |

In the examples listed in Tables 1 and 2, according to the high-temperature hardness test at 1000° C. for 1000 h, the temperature change of the resistance equals less than three percent, from which, for a B-constant of 3600K and a nominal resistance $\rho_{25}°$ C.=200 kΩcm, a standard deviation of the temperature measurement $\Delta T=\pm 3$ to 5K is produced.

The measurement values of the Tables 1 and 2 mentioned above thus show particularly clearly that for different compositions x, y, and z for the different embodiments of the ceramic materials according to the invention, thermistors can be produced that can be used reliably with high-temperature stability up to 1000° C.

The invention is not limited by the description with reference to the embodiments. Instead, the invention comprises every novel feature as well as every combination of features that includes, in particular, every combination of features in the claims, even if this feature or this combination itself is not disclosed explicitly in the claims or embodiments.

What is claimed is:

1. A ceramic material with negative temperature coefficient of resistance with the general formula:

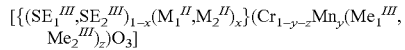

wherein $(SE_1^{III}, SE_2^{III})$ are rare-earth metal cations and $SE_1^{III}$ can be equal to $SE_2^{III}$ or stands for different rare-earth metal cations for mixtures of $SE_1^{III}$ and $SE_2^{III}$, $M_1^{II}$ can be equal to $M_2^{II}$ or their mixtures with variable percentages and stands for bivalent metal cations, and $Me_1^{III}$ and $Me_2^{III}$ are redox-stable, trivalent metal cations that can be equal or different and the following applies: $0 < x < 1$; $0 < z \leq 0.3$; $0 < y < 1-z$.

2. The ceramic material according to claim 1, with the general formula:

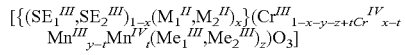

wherein the following applies with respect to the parameters:

$x+y+z<1$; $0<x<1$; $0<z\leq 0.3$; $0\leq t \leq x$ where, for $0<t<x$, the following applies: $t \leq y < 1+t-x-z$, for $t=0$ the following applies: $0<y\leq 1-x-z$, and for $t=x$, the following applies: $x<y<1-z$.

3. The ceramic material according to claim 2, with the general formula for $t=0$ or $t=x$:

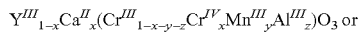

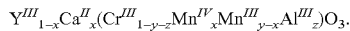

4. The ceramic material according to claim 1, wherein $SE_1^{III}$ and $SE_2^{III}$ comprise cations selected from the group consisting of $Y^{III}$, $Ce^{III}$, $Sm^{III}$ and $La^{III}$.

5. The ceramic material according to claim 1, wherein $Me_1^{III}$ and $Me_2^{III}$ comprise metal cations selected from the group consisting of $Al^{III}$ and $Ga^{III}$.

6. The ceramic material according to claim 1, wherein x: $0.01 \leq x \leq 0.5$.

7. The ceramic material according to claim 1, wherein y: $0.01 \leq y \leq 0.7$.

8. The ceramic material according to claim 1, wherein z: $0.05 \leq z \leq 0.3$.

9. The ceramic material according to claim 1, wherein the material is constructed as a phase-homogeneous Perovskite mixed-crystal system of a first electrically semiconductive Perovskite system and a second electrically non-conductive Perovskite system.

10. The ceramic material according to claim 9, wherein the first electrically semiconductive Perovskite system comprises $SE^{III}_{1-x}M^{II}_x(Cr_{1-y}Mn_y)O_3$ and the second electrically non-conductive Perovskite system comprises $SE^{III}Me^{III}O_3$.

11. The ceramic material according to claim 1, wherein the bivalent metal cations $M_1^{II}, M_2^{II}$ are selected from $Ca^{II}$, $Sr^{II}$.

12. A method for producing the ceramic material according to claim 1, the method comprising:

preparing a mixture of compounds $SE^{III}_2O_3$, $M^{II}CO_3$, $Cr_2O_3$, $Mn_2O_3$, $Mn_3O_4$, $MnCO_3$ and $Me^{III}_2O_3$ in desired quantities; and sintering the mixture, wherein the ceramic material has a general formula of:

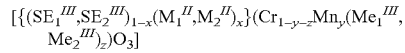

wherein $(SE_1^{III}, SE_2^{III})$ are rare-earth metal cations and $SE_1^{III}$ can be equal to $SE_2^{III}$ or stands for different rare-earth metal cations for mixtures of $SE_1^{III}$ and $SE_2^{III}$, $M_1^{II}$ can be equal to $M_2^{II}$ or their mixtures with variable percentages and stands for bivalent metal cations, and $Me_1^{III}$ and $Me_2^{III}$ redox-stable, trivalent metal cations that can be equal or different and the following applies: $0<x<1$ $0<z\leq 0.3$; $0<y<1-z$.

13. The method according to claim 12, further comprising calcining the mixture of the compounds before the sintering.

14. The method according to claim 12, wherein a phase-homogeneous Perovskite mixed-crystal system is formed.

15. The method according to claim 12, further comprising adding a sintering aid.

16. An electroceramic component comprising:
a ceramic material having a general formula of:

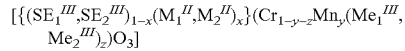

wherein $(SE_1^{III}, SE_2^{III})$ are rare-earth metal cations and $SE_1^{III}$ can be equal to $SE_2^{III}$ or stands for different rare-earth metal cations for mixtures of $SE_1^{III}$ and $SE_2^{III}$, $M_1^{II}$ can be equal to $M_2^{II}$ or their mixtures with variable percentages and stands for bivalent metal cations, and $Me_1^{III}$ and $Me_2^{III}$ redox-stable, trivalent metal cations that can be equal or different and the following applies: $0<x<1$ $0<z\leq 0.3$; $0<y<1-z$.

17. The electroceramic component according to claim 16 comprising:
a ceramic base body that contains the ceramic material; and
electrically conductive electrode faces adjacent the ceramic base body.

18. The electroceramic component according to claim 16, wherein x: $0.01 \leq x \leq 0.5$.

19. The electroceramic component according to claim 16, wherein y: $0.01 \leq y \leq 0.7$.

20. The electroceramic component according to claim 16, wherein z: $0.05 \leq z \leq 0.3$.

* * * * *